United States Patent [19]
Jones et al.

[11] Patent Number: 5,929,804
[45] Date of Patent: Jul. 27, 1999

[54] RECONFIGURABLE ZONAL BEAM FORMING SYSTEM FOR AN ANTENNA ON A SATELLITE IN ORBIT AND METHOD OF OPTIMIZING RECONFIGURATION

[75] Inventors: Trevor Howar Price Jones, Haarlemmermeer, Canada; Bénédicte Folio, Paris, France; Michael Philip Yarwood, Sawbridgeworth, United Kingdom; xavier Jean-François Lambrecht, Mandelieu, France

[73] Assignee: Agence Spatiale Europeene, Paris, France

[21] Appl. No.: 08/881,134

[22] Filed: Jun. 24, 1997

Related U.S. Application Data

[30] Foreign Application Priority Data

Jun. 24, 1996 [FR] France ................................. 96 07813

[51] Int. Cl.⁶ ................................................. H04B 7/185
[52] U.S. Cl. ............................ 342/354; 342/373; 455/13.3
[58] Field of Search .................................. 342/354, 373, 342/353, 368, 374; 455/13.3

[56] References Cited

U.S. PATENT DOCUMENTS

| | | | |
|---|---|---|---|
| 4,124,852 | 11/1978 | Steudel | 343/854 |
| 4,315,262 | 2/1982 | Acampora et al. | 342/353 |
| 4,980,692 | 12/1990 | Rudish et al. | 343/700 |
| 5,548,295 | 8/1996 | Lo Forti et al. | 342/373 |
| 5,550,550 | 8/1996 | Das | 342/353 |

OTHER PUBLICATIONS

Sandrin, W.A., "Spatial Distribution of Intermodulation Products in Active Phased Array Antennas," *IEEE Transactions on Antennas and Propagation*, vol. 21, No. 6, Nov. 1973, pp. 864–868.

Angelucci, A. et al., "High Performance Microstrip networks for Multibeam and Reconfigurable Operation in Mobile–Radio Systems," *Proceeding Of The Global Telecommunications Conference*, Nov. 28, 1994, vol. 3 or 3, pp. 1717–1721.

*Primary Examiner*—Gregory C. Issing
*Attorney, Agent, or Firm*—Sughrue, Mion, Zinn, Macpeak & Seas, PLLC

[57] ABSTRACT

A reconfigurable zonal beam forming system for an antenna on a satellite in orbit includes, in cascade, a signal splitter applying signals of equal amplitude to each channel, first variable phase-shifters and amplifiers and a Butler matrix the outputs of which are connected via second variable phase-shifters to the radiating source elements of the antenna. Varying the phase-shifts introduced by the first and second phase-shifters reconfigures the transmitted beam optimally. A preferred variant of the system further includes variable attenuators. A control device is used to apply optimization parameters. A method of optimizing the resulting configuration uses a gradient search algorithm.

9 Claims, 3 Drawing Sheets

PRIOR ART
FIG_1
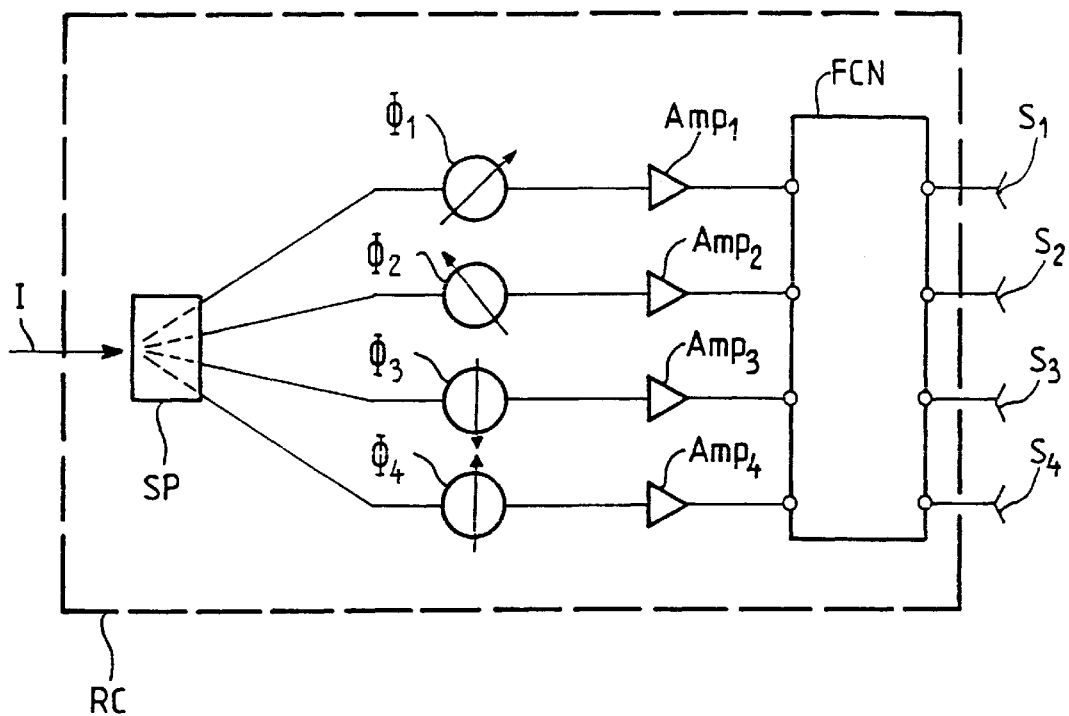
FIG_2
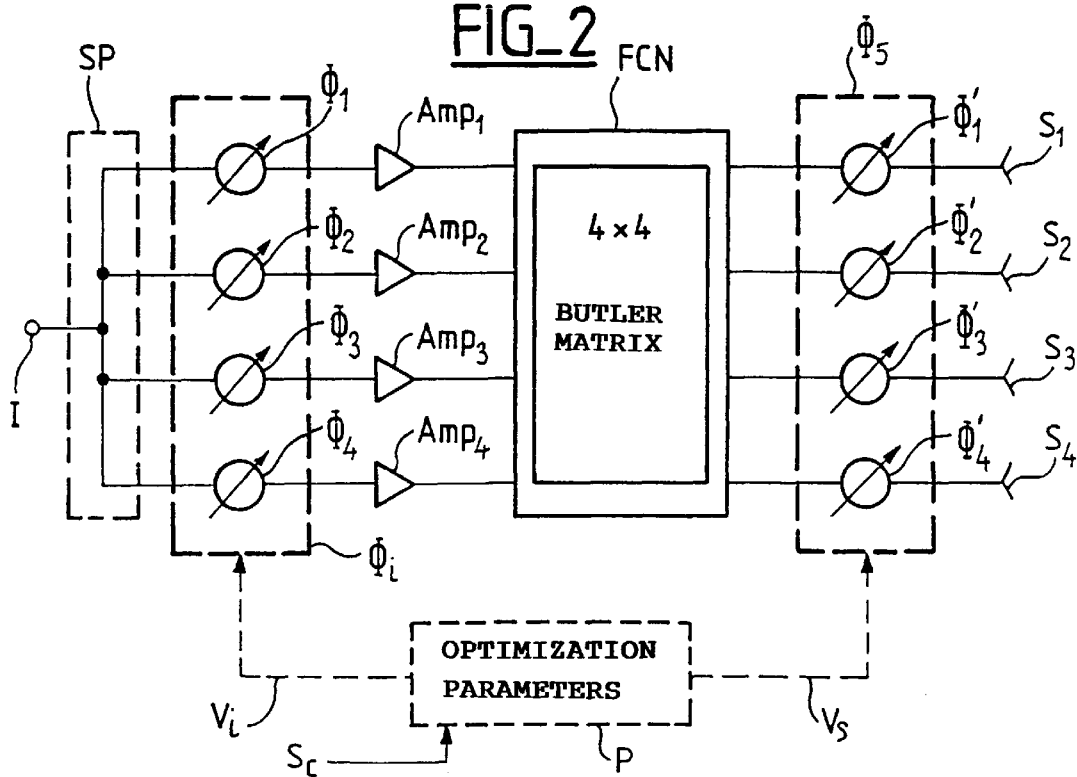

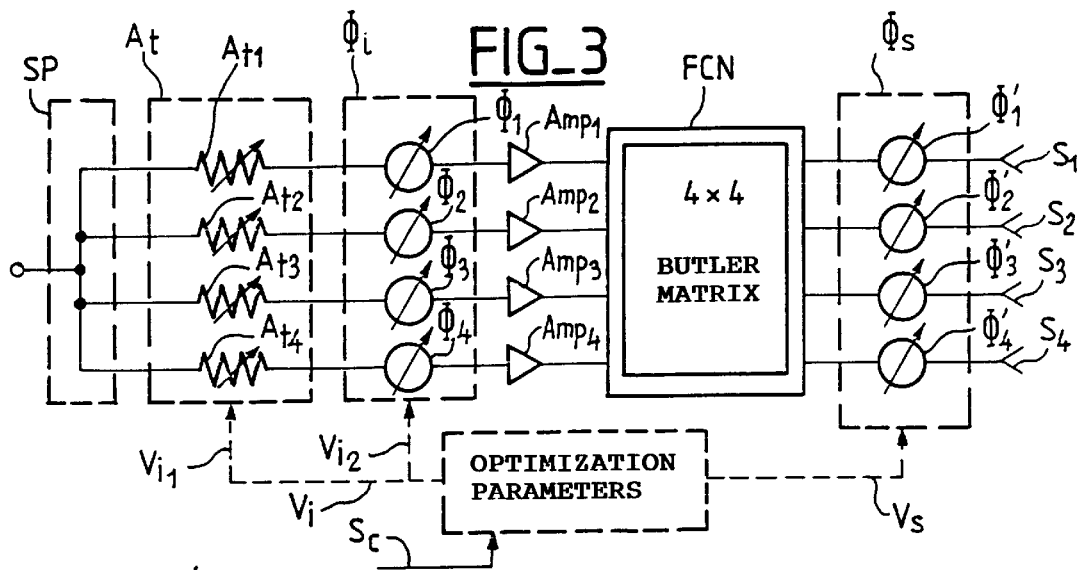
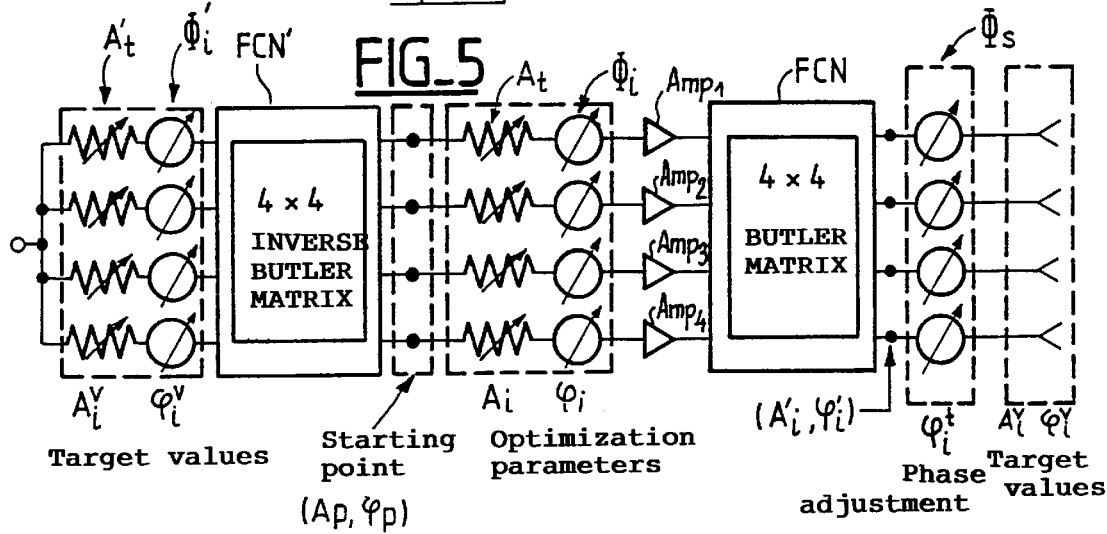
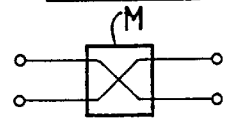
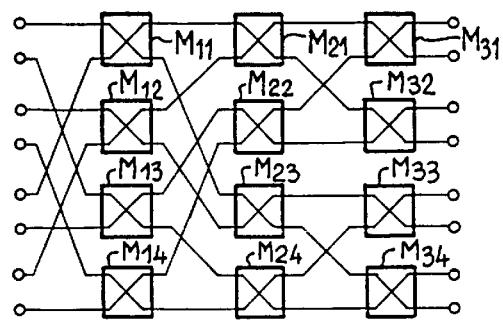
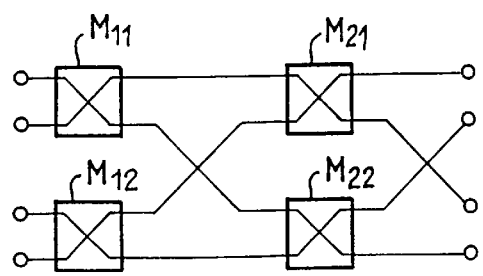

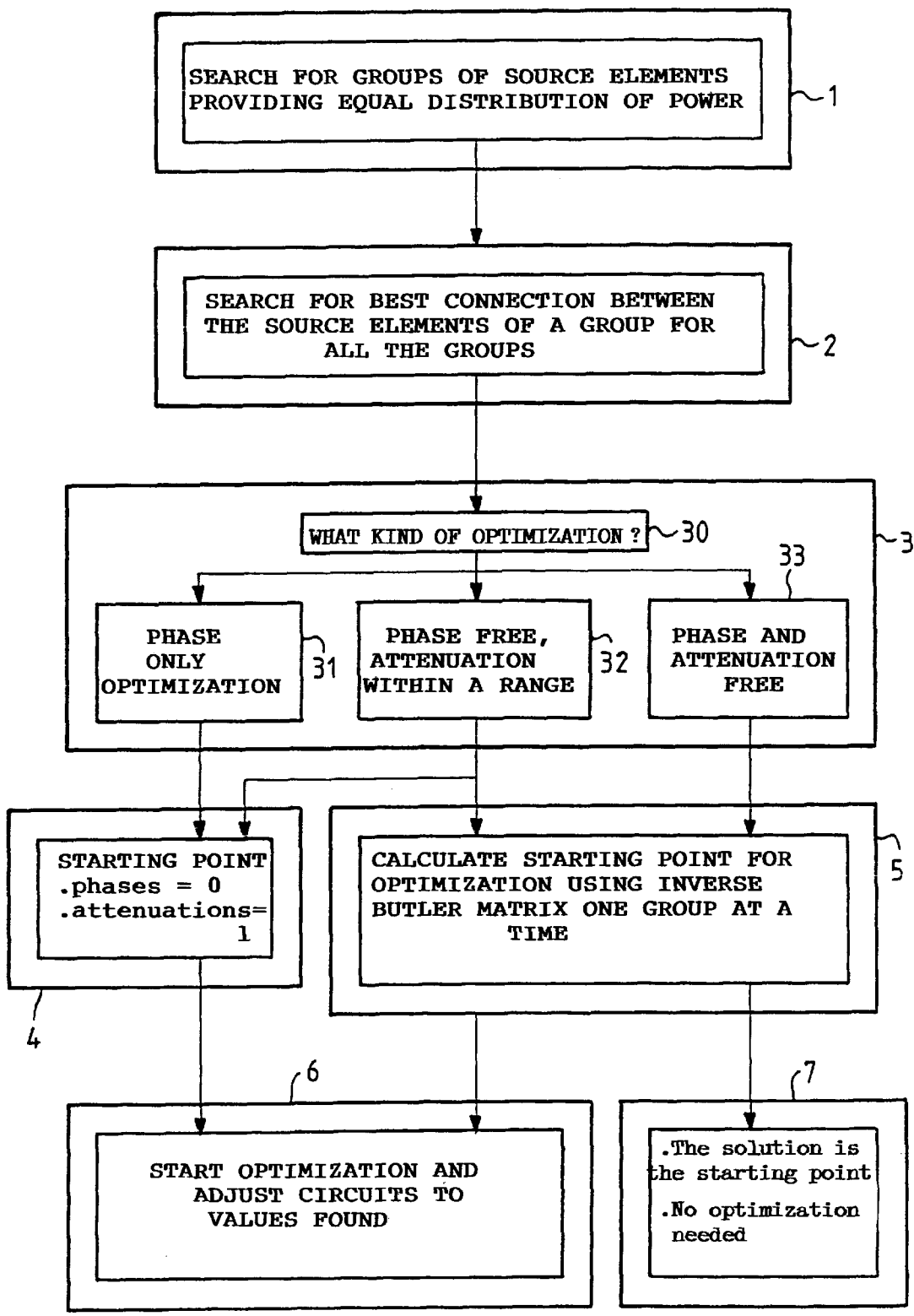

RECONFIGURABLE ZONAL BEAM FORMING SYSTEM FOR AN ANTENNA ON A SATELLITE IN ORBIT AND METHOD OF OPTIMIZING RECONFIGURATION

BACKGROUND OF THE INVENTION

1. Field of the Invention

The invention concerns a reconfigurable zonal beam forming system for an antenna on a satellite in orbit.

The invention also concerns a method of optimizing reconfiguration by a system of the above kind.

2. Description of the Prior Art

Recent years have seen very substantial growth in new markets for transmission by satellites, in many applications. This growth results in particular from "Global Information Infrastructure" and "Global Mobile Communication" systems, a phenomenon that has been accentuated by the relaxing of national laws governing telecommunications in some countries, to the point of "total deregulation" in some cases. The number of operators offering varied services has increased rapidly and users have been offered a more comprehensive choice and greater flexibility, enabling an optimum fit of the resources offered to their requirements.

It is therefore becoming necessary to make projections for the very long term future, given that there is a period of 2 to 3 years between the signing of a contract for the launch of a telecommunication satellite and the arrival of the satellite in orbit, and given that the service life of a satellite of this kind is typically 12 to 15 years on average.

To obtain a sufficient return on investment, this requires the onboard telecommunication system to be very flexible. In practical terms, this means that it must be possible for the coverage of the satellite to be modified in situ, i.e. in orbit.

Considering the far field radiation pattern of the antenna, i.e. the imprint of the beam on the surface of the Earth, the beam can be characterized by a number of parameters: directivity, transmitted power distribution (curve in two dimensions), etc. It must be possible to modify all of these parameters if the beam is to be reconfigurable at will.

Conventional satellites transmitting in the C, Ka and Ku bands are conventionally subject to various constraints which reduce numerous aspects of flexibility: beam coverage, frequency plan, maximum power per channel, etc.

Attempts have naturally been made to develop devices and/or methods of circumventing these limitations, but only a modest improvement in flexibility has been achieved, usually at the cost of a substantial increase in the amount and/or complexity of satellite hardware.

Of the methods proposed in the prior art, the most interesting ones appear to be of the type using distributed amplification within the beam forming section of the onboard transmission system, which is the system feeding the antenna of the satellite.

Without seeking to be exhaustive, two types of prior art solution may be cited.

The first is described in patent U.S. Pat. No. 5,115,248 (Antoine Roederer). This discloses a multibeam antenna feed device. According to this patent, a number of contiguous narrow beams ("spots") are generated. The problem to be solved is that of producing simultaneously good overlap between adjacent beams and effective illumination of a reflector forming the transmit antenna.

To achieve this, overlapping source elements are used to generate the aforementioned adjacent beams. To be more precise, the source elements is controlled by a separate matrix of amplifiers in each overlap region. By interleaving the outputs of the matrices to feed the locations systematically, a continuous array of beams can be generated.

However, although this method definitely enables reconfiguration of the transmitted radiation, it has a number of disadvantages. In particular, as just indicated, it necessitates the use of multiple matrices, which greatly increases the cost and the complexity of the hardware. Moreover, this approach cannot be generalized to the reconfiguration of complex zonal beams unless a very high degree of imbalance between the amplifiers is acceptable.

Another example is described in an article by Howard H. S. LUH: "A Variable Power Dual Mode Network for Reconfigurable Shaped Beam Antenna", published in "IEEE TRANSACTIONS ON ANTENNAS AND PROPAGATION", Vol. AP-32, N° 12, Dec. 1984.

To generate variable phase excitation and amplitude at the feed ports, variable phase-shifter devices must be inserted between the hybrid circuits to modify the power distribution at the hybrid output ports. Further phase-shifter devices are used to adjust the relative phases of the channels (see FIG. 2: $a$, $b$ and $c$ of the above document).

The complexity of the array increases as the number of feeds requiring variable excitation increases. As a general rule, systems like this have been developed to employ centralized power concepts. Increasing the number of phase-shifters in the channels increases the losses and makes it difficult to generate simultaneous narrow beams.

As a general rule, a prior art system using distributed amplification in the beam forming section is of the form shown diagrammatically in FIG. 1 accompanying this description.

The input power I is divided into signals of equal amplitude by a splitter SP followed by variable phase-shifters $\Phi_1$ through $\Phi_4$ (assuming four channels to make the example more concrete). The outputs of the phase-shifters $\Phi_1$ through $\Phi_4$ are transmitted to the inputs of four amplifiers $Amp_1$ through $Amp_4$ the outputs of which drive a fixed coupling network FCN based on one more Butler matrices. Finally, the outputs of the FCN supply the power for excitation of source elements $S_1$ through $S_4$ of the antenna.

It is therefore entirely possible to use this system, which constitutes a Butler matrix-based first level beam forming network, to generate and supply an amplitude distribution to the source elements $S_1$ through $S_4$.

This result is definitely obtained if phase-shifted signals of equal amplitude are transmitted to the inputs of the FCN. However, a problem arises on attempting to reconfigure the beam to obtain a different beam with an arbitrary contour.

To obtain generalized and flexible reconfiguration of zonal beams it is necessary to provide for the excitation of each source to be variable, not only in amplitude but also in phase, and to comply very strictly with optimal values.

When prior art circuits like that shown in FIG. 1 are used, the input phase-shifters $\Phi_1$ through $\Phi_4$ can be adjusted to obtain a satisfactory phase match for the required new arbitrary contour to be obtained. However, it is not generally possible simultaneously to obtain an adequate distribution of amplitudes at the source elements and because of this the result of reconfiguration is significant deterioration of the new zonal beam (compared to optimal excitation of the source elements).

On the other hand, the phase-shifters can be adjusted to generate a reasonable distribution of amplitudes between the source elements compared to a required optimum (or target value), but it is then generally not possible to obtain a good balance of the phase distribution. This also results in significant deterioration of the zonal beam.

The aim of the invention is to overcome the disadvantages of the prior art devices whilst retaining a beam forming system of the above type.

It procures, simultaneously, good distribution in phase and in amplitude and therefore optimum excitation of the source elements of the antenna. It therefore provides a reconfigurable zonal beam made up of narrow beams that are fixed or variable.

To achieve this, in accordance with a first important feature of the invention, further second level phase-shifters are inserted between the first level forming network RC (see FIG. 1) and the antenna sources $S_1$ through $S_4$ (more generally, $S_x$ where x is any integer).

A reasonably balanced but not entirely exact amplitude distribution can be obtained by adjusting the input phase-shifters. By also adjusting the output (second level) phase-shifters it is possible to obtain simultaneously the best possible distribution of phases for the source elements.

This feature alone products a better result than that obtained by the prior art systems.

Nevertheless, there remain two basic problems:

1/ As just indicated, the amplitude balance of the signals is not perfect, resulting in a small but real deterioration of the reconfigured beam;

2/ There is generally no exact solution to this problem and many input signal phase combinations produce results that are similar in practise, in particular by allowing for all possible combinations of interconnections between the feed ports of the source elements and the outputs of the coupling network.

An exhaustive search method can of course be used, but analysis shows that for high order matrices, typically of order 8 or above, very long computation times become necessary, even if very powerful and very fast computers are used, typically one month or more. Moreover, there is no guarantee that the best global solution will be obtained.

Accordingly, in accordance with a second important feature of the invention, provisions are implemented to optimize the beam reconfiguration method of the invention and to obtain fast convergence towards a global solution.

To achieve this, the fixed input splitter supplying equal power amplitude signals is replaced by a substitute coupling network. This input network is identical to the pre-existing "normal" network, except that the Butler matrix is the inverse matrix of the latter network. This makes it possible to find immediately an exact solution to the source element amplitude distribution. One property of the Butler matrix type transponder principle is exploited. A signal transmitted to a particular input of a Butler matrix will be transmitted to a single output in a manner that can be predicted. By the principle of superposition, the relative amplitude distribution of the signals at the output ports, and therefore at the source elements, can be imposed at the input ports.

However, this arrangement generally leads to a significant imbalance between the amplifiers. A minimal imbalance can be obtained by rotating the relative phases of the input signals. At the end of this process, the error in the excitation of the source elements is nulled and the aforementioned minimum imbalance obtained. By this method all possible combinations of source element interconnections can be rapidly evaluated, in contrast to the prior art. By defining error functions as explained hereinafter and by launching a gradient search algorithm, the lowest global error (amplifier imbalance and feed excitation error) can be determined. In a final phase of the process, the substitute network is withdrawn. The attenuators are adjusted in accordance with the values determined in the previous phases.

SUMMARY OF THE INVENTION

Accordingly, the invention consists in a reconfigurable zonal beam forming system for an antenna on a satellite in orbit having a particular number N of channels, comprising at least one input splitter dividing an input signal into N signals of equal amplitude applied to the N channels, a first set of input variable phase-shifters and a set of signal amplifiers, each channel comprising a phase-shifter and an amplifier in cascade, a first Butler matrix with N inputs and N outputs, and N radiating source elements, adjusting the phases of the N input phase-shifters to a particular phase value procuring the reconfiguration of the radiation pattern of the antenna, the system further comprising a second set of N output variable phase-shifters, one of these variable phase-shifters being disposed between each of the outputs of the Butler matrix and each of the antenna source elements, the relative adjustment of the phase-shifts introduced by the input phase-shifters and the output phase-shifters procuring a balanced distribution of the amplitudes of the excitation signals of the radiating source elements necessary for the reconfiguration.

The invention also consists in a method of optimizing the reconfiguration obtained by a system of the above kind.

The invention is more particularly, although not exclusively, concerned with geostationary telecommunication satellites.

The invention will be better understood and other features and advantages will emerge from a reading of the following description with reference to the accompanying drawings.

BRIEF DESCRIPTION OF THE DRAWINGS

FIG. 1 shows one example of a prior art beam forming system.

FIG. 2 shows one example of a reconfigurable zonal beam forming system for an antenna on a satellite in orbit constituting a first embodiment of the invention.

FIG. 3 shows a variant of this reconfigurable zonal beam forming system for an antenna on a satellite in orbit.

FIGS. 4a through 4c show examples of Butler matrix configurations that can be used in the context of the invention.

FIG. 5 shows one example of a reconfigurable zonal beam forming system for an antenna on a satellite in orbit which is used to explain the methods of optimizing beam reconfiguration in accordance with the invention.

FIG. 6 is a flowchart showing diagrammatically the possible steps of the complete optimization method of the invention and the alternative choices of this method.

DETAILED DESCRIPTION OF THE PREFERRED EMBODIMENTS

FIG. 2 shows an example of a reconfigurable zonal beam forming system for an antenna on a satellite in orbit constituting a first embodiment of the invention. To make the example more concrete, it is assumed that there are four source elements.

It uses the same global architecture as the prior art system shown in FIG. 1: an input splitter SP (supplying output signals of equal amplitude), a set of input variable phase-shifters $\Phi_i$ ($\Phi_1$ through $\Phi_4$), a set of amplifiers $Amp_1$ through $Amp_4$, a fourth order Butler matrix FCN and source elements $S_1$ through $S_4$. All the circuits have the same function as their counterparts in FIG. 1 and there is no need to describe them again.

As already mentioned, in accordance with a first important feature of the invention a set of output variable phase-shifters $\Phi_s$, namely four phase-shifters $\Phi'_1$ through $\Phi'_4$ in the FIG. 2 example, are inserted between the Butler matrix FCN and the source elements $S_1$ through $S_4$. As they are in the circuits on the output side of the amplifiers $Amp_1$ through $Amp_4$, they are naturally high-power phase-shifters, unlike the input phase-shifters $\Phi_1$ through $\Phi_4$.

As a general rule, the number Na of amplifiers is equal to the number Np of input ports of the coupling network (Butler matrix) and greater than or equal to the number Nf of source elements contributing to the radiation from the antenna (Na≧Nf). The number Npsh of phase-shifters is equal to the number Np of output and input ports of the coupler (Npsh=Np=Na).

The amplitude distribution at the source elements $S_1$ through $S_4$ can be modified by adjusting the relative phases of the input phase-shifters $\Phi_i$, and the output phase-shifters $\Phi_s$, in order to obtain approximately the excitation amplitude necessary to reconfigure the zonal beam. To achieve this, the system has a control device P applying optimization parameters to the two series of phase-shifters. These parameters are produced by computations carried out either on board the satellite itself (if the latter carries computation means) or in a ground control station transmitting commands to the satellite. In both cases command signals $S_c$ are transmitted to the control device P for application of the optimization parameters. In practise the device P can be implemented using conventional electronic circuits translating the commands received (command signals $S_c$) into two series of signals $V_i$ and $V_s$ applied to the input phase-shifters $\Phi_i$ and to the output phase-shifters $\Phi_s$, respectively. These signals adjust the operating point of the phase-shifters $\Phi_i$ and $\Phi_s$ in such manner as to obtain the aforementioned optimization.

However, excitation with the correct phase generally leads to quantifiable loss of directivity of the antenna compared to the optimum. On the other hand, all of the amplifiers $Amp_1$ through $Amp_4$ work at exactly the same operating point and therefore at their maximal efficiency.

If limited attenuation is introduced on the input side of each amplifier $Amp_1$ through $Amp_4$ an error is introduced into the operating point of these amplifiers. However, optimum adjustment of the attenuation reduces the excitation amplitude error at the source elements.

FIG. 3 shows one such arrangement. All the units and circuits from FIG. 2 are seen again and there is no need to describe them again. In this embodiment variable attenuators $A_t$ ($A_{t1}$ through $A_{t4}$) have been introduced in series with each phase-shifter $\Phi_1$ through $\Phi_4$. The input command signals $V_I$ delivered by the device P are split into two series of signals: $V_{i1}$ commanding the operating point of the attenuators $A_{t1}$ through $A_{t4}$ and $V_{i2}$ commanding the operating point of the first level or input phase-shifters $\Phi_1$ through $\Phi_4$, as previously.

These provision alone procure a better result than that obtained by the prior art systems. Nevertheless, this result can be further improved by optimizing the operating points of the various units constituting the system.

To optimize overall performance it is necessary to consider together the error introduced in terms of the operating points of the amplifiers, hereinafter designated $F_2$, and the excitation error at the source elements, hereinafter designated $F_1$. These errors are used to define a global error function $F_{err}$.

The prior art optimization methods are based on exhaustively searching for the best possible combination. However, this method very quickly runs up against limitations. For a system with four source elements, like that shown in FIG. 2 and 3, there are three degrees of freedom (one phase may be fixed at zero as a reference). To give a concrete example, taking a step of 7.2°, there are 125 000 (50^3) evaluations of the error function. This method is possible for four source elements but cannot be implemented for larger numbers of source elements. For just eight source elements, for example, the number of evaluations is equal to 8 $10^{11}$.

The invention proposes an optimization method resulting in fast convergence.

Referring again to the FIG. 3 system, this is characterized by an attenuator $A_{t1}$ through $A_{t4}$ in series with a phase-shifter $\Phi_1$ through $\Phi_4$ on each input branch of the Butler matrix FCN. It is initially assumed that the gain of each amplifier $Amp_1$ through $Amp_4$ is equal to 0 dB. $A_i$ and $\phi_i$ are the amplitude and phase parameters respectively associated with the attenuators $A_{t1}$ through $A_{t4}$ and with the input phase-shifters $\Phi_1$ through $\Phi_4$ (controlled by the command signals $V_{i1}$ and $V_{i2}$). $\phi'_i$ and $A'_i$ are respectively the phase and amplitude values of the Butler matrix output signals. $\phi'_I$ designates the phase adjustment values of the output phase-shifters $\Phi'_1$ through $\Phi'_4$. Finally, $\phi_i^v$ and $A_i^v$ designate the amplitude and phase values of the target excitation signals (i.e. the values needed to obtain the new configuration) at the level of the source elements $S_1$ through $S_4$. Because the outputs of the phase-shifters $\Phi_1$ through $\Phi_4$ have no influence on the outputs of the matrix FCN, the only values to be optimized are the amplitudes $A'_i$ of the matrix output signals. The optimization method therefore consists in finding the amplitudes $A'_i$ of the input signals generating amplitudes as close as possible to the target values $A_i^v$, in accordance with optimization constraints. The phase values $\phi_I^v$ of the output phase-shifters $\Phi'_1$ through $\Phi'_4$ can be calculated afterwards.

Accordingly, for a matrix with n inputs, it is necessary to consider 2n input variables: phases and attenuations to optimize n output variables (amplitudes $A_i^v$). One of the input phases can be taken as the reference phase and made equal to 0°.

Ideally, the attenuation factors should all be equal to 0 dB to enable all of the amplifiers to work at the same operating point and therefore at optimum efficiency. However, our tests have shown that these provisions lead to major errors in the excitation signal amplitudes and losses of antenna directivity in the order of 0.5 dB. If small amplitude variations at the inputs of the amplifiers $Amp_1$ through $Amp_4$ are authorized (for example variations in the order of 15% to 20%), the output errors are reduced, although at the cost of an increase in the losses in the amplifiers, which no longer operate at the optimum efficiency. The range of possible variations of the amplifiers naturally depends on the particular characteristics.

The final aim of optimization is therefore to find a compromise between the directivity losses and the amplification losses, it being understood that a coverage must be provided that it is as close as possible to that required by the satellite transmission system user (target values). Ideally, the combined losses of both types should not exceed the losses with signals of equal amplitude at the amplifier inputs.

Before defining the global error function $F_{err}$, it is necessary to outline a few properties of Butler matrices.

A circuit of this kind is built up from hybrid circuit couplers. FIG. 4a shows in diagrammatic form an elementary Butler matrix M. It has two inputs and two outputs. The inputs are crossed over relative to the outputs. The transfer function of a circuit of this kind is as follows:

$$T_1 = \frac{1}{\sqrt{2}} \begin{pmatrix} 1 & -j \\ -j & 1 \end{pmatrix}$$

FIG. 4b shows a 4×4 Butler matrix. It has four inputs and four outputs. It is constructed from four elementary matrices $M_{11}$ through $M_{22}$ in two columns and two rows: $M_{11}$ and $M_{12}$ in the first column and $M_{21}$ and $M_{22}$ in the second column. The top and bottom outputs of the matrices $M_{11}$ and $M_{12}$ are transmitted directly to the inputs of the matrices $M_{21}$ and $M_{22}$. The bottom and top outputs of these same matrices are crossed over. This arrangement is used for the outputs of the matrices $M_{21}$ and $M_{22}$. There is therefore a unique path establishing a one-to-one correspondence between each input-output pair.

The transfer function of a 4×4 Butler matrix is as follows:

$$T_2 = \frac{1}{2}\begin{pmatrix} T_1 & -jT_1 \\ -jT_1 & T_1 \end{pmatrix} = \frac{1}{2}\begin{pmatrix} 1 & -j & -j & -1 \\ -j & 1 & -1 & -j \\ -j & -1 & 1 & -j \\ -1 & -j & -j & 1 \end{pmatrix}$$

Larger matrices can be constructed progressively. FIG. 4c shows an 8×8 matrix. It is made up of three columns each of four rows of elementary matrices: $M_{11}$ through $M_{34}$.

The transfer function of this matrix is as follows:

$$T_3 = \frac{1}{\sqrt{8}}\begin{pmatrix} 1 & -j & -j & -1 & -j & -1 & -1 & 1 \\ -j & 1 & -1 & -j & -1 & -j & j & -1 \\ -j & -1 & 1 & -j & -1 & j & -j & -1 \\ -1 & -j & -j & 1 & j & -1 & -1 & -j \\ -j & -1 & -1 & j & 1 & -j & -j & -1 \\ -1 & -j & j & -1 & -j & 1 & -1 & -j \\ -1 & j & -j & -1 & -j & -1 & 1 & -j \\ j & -1 & -1 & -j & -1 & -j & -j & 1 \end{pmatrix}$$

It can easily be deduced that these matrices can be reduced to phase matrices with the following correspondences: 1→0°, -j→-90°, -1→-180° and j→-270°.

Under these conditions, the 8×8 matrix becomes:

$$\underline{\theta} = \begin{pmatrix} 0 & -90 & -90 & -180 & -90 & -180 & -180 & -270 \\ -90 & 0 & -180 & -90 & -180 & -90 & -270 & -180 \\ -180 & -90 & 0 & -90 & -180 & -270 & -90 & -180 \\ -180 & -90 & -90 & 0 & -270 & -180 & -180 & -90 \\ -90 & -180 & -180 & -270 & 0 & -90 & -90 & -180 \\ -90 & -180 & -270 & -180 & -90 & 0 & -180 & -90 \\ -180 & -270 & -90 & -180 & -90 & -180 & 0 & -90 \\ -270 & -180 & -180 & -90 & -180 & -90 & -90 & 0 \end{pmatrix}$$

It is possible to divide this matrix $\underline{\theta}$ into two sub-matrices $\underline{\theta}_1$ and $\underline{\theta}_2$. The division of power is represented by the coefficient associated with the transfer matrices $T_i$. For a matrix with n inputs, this coefficient is equal to $\sqrt{n}$.

The analytic formulation of the input vector is as follows:

$$\underline{I} = [A_1 e^{j\phi_1}, A_2 e^{j\phi_2}, \ldots, A_n e^{j\phi_n}]$$

The analytic formulation of the output vector is as follows:

$$\underline{O} = [A'_1 e^{j\varphi_1}, A'_2 e^{j\varphi_2}, \ldots, A'_n e^{j\varphi_n}]$$

$$\underline{O} = \underline{T} \cdot \underline{I}$$

$$O_i = \sum_{k=1}^{n} T_{ik} \cdot A_k \cdot e^{j\varphi_k} \text{ with } T_{ik} = \frac{e^{j\varphi_k}}{\sqrt{n}}, \text{ whence}$$

$$O_i = \frac{1}{\sqrt{n}} \sum_{k=1}^{n} e^{j\theta_{ik}} \cdot A_k \cdot e^{j\varphi_k}, \text{ and}$$

$$O_i = \frac{1}{\sqrt{n}} \left[ \sum_{k=1}^{n} A_k \cdot \cos(\theta_{ik} + \varphi_k) + j \sum_{k=1}^{n} A_k \cdot \sin(\theta_{ik} + \varphi_k) \right]$$

Only the amplitudes $A'_i$ have to be optimized, whence:

$$A'_1 = |O_i| = \frac{1}{\sqrt{n}} \sqrt{\left(\sum_{k=1}^{n} A_k \cdot \cos(\theta_{ik} + \varphi_k)\right)^2 + \left(\sum_{k=1}^{n} A_k \cdot \sin(\theta_{ik} + \varphi_k)\right)^2}$$

$$\tan(\varphi'_i) = \frac{\sum_{k=1}^{n} A_k \cdot \sin(\theta_{ik} + \varphi_k)}{\sum_{k=1}^{n} A_k \cdot \cos(\theta_{ik} + \varphi_k)}$$

The phase factors $\phi'_i$ are used to calculate the phases of the output phase-shifters $\Phi'_1$ through $\Phi'_4$.

The global error function $F_{err}$ can be defined as follows:

$$F_{err} = F_1 * F_2$$

The analytic formulation for $F_1$ is as follows:

$$F_1 = \sum_{i=1}^{n} |A_i^y - A'_i|, \text{ whence}$$

$$F_1 = \sum_{i=1}^{n} \left| A_i^y - \frac{1}{\sqrt{n}} \sqrt{\left(\sum_{k=1}^{n} A_k \cdot \cos(\theta_{ik} + \varphi_k)\right)^2 + \left(\sum_{k=1}^{n} A_k \cdot \sin(\theta_{ik} + \varphi_k)\right)^2} \right|$$

In determining $F_2$, an attempt is made to retain the attenuation factors $A_i$ within a predetermined range, such that the following equation is satisfied:

$$F_2 = \prod_{i=1}^{n} \left[ 1 + \left| \frac{A_i - 1}{a} \right|^b \right]$$

The curve in FIG. 5 shows the function $f = (X/a)b$.

The coefficients a and b must be determined to satisfy the demands of the required optimization. It is assumed that the function f is equal to $Y_0$ when $X = X_0$ and that f is equal to $Y_0/d$ for $ex_0$, c and d being predetermined coefficients. The following equations are then satisfied:

$$\left. \begin{array}{l} \left(\dfrac{X_0}{a}\right)^i = Y_0 \\ \left(\dfrac{cX_0}{a}\right)^h = \dfrac{Y_0}{d} \end{array} \right\} \Rightarrow \begin{array}{l} b = -\dfrac{\log(d)}{\log(c)} \\ a = \dfrac{X_0}{\sqrt{Y_0^b}} \end{array}$$

With these coefficients a and b, the values of f will be less than $Y_0/d$ if X is less than $cX_0$. Beyond the value $cX_0$, the slope of f becomes very high and tends towards infinity.

To provide a more concrete example, the following predefined values are used:

$Y_0=9$, $X_0=0.2$, $c=0.8$ and $d=9$, in which case, $a=0.16$ and $b=9.81$.

Consider now the expression $$F_{2i} = 1 + \left|\frac{A_i - 1}{a}\right|^2,$$

which is one of the components of $F_2$. A variation of $A_i$ in the order of 16% around unity leads to an error $F_{2i}$ equal to 2. If the variation reaches an amplitude of 20%, the error in $F_{2i}$ is equal to 10.

The deduction is that if the attenuation factors Ai remain within the range defined by a and b, the contribution of $F_2$ to the error function remains small.

The global error function can now be written as follows:

$$F_{err} = \sum_{i=1}^{n}\left|A_i^y - \frac{1}{\sqrt{n}}\sqrt{\left(\sum_{k=1}^{n}A_k\cdot\cos(\theta_{ik}+\varphi_k)\right)^2 + \left(\sum_{k=1}^{n}A_k\cdot\sin(\theta_{ik}+\varphi_k)\right)^2}\right| \cdot \prod_{i=1}^{n}\left[1+\left|\frac{A_i-1}{a}\right|^b\right]$$

This first step having been completed, a gradient search algorithm is applied. This type of algorithm is used to define the extreme value of a function. In the present instance it is the minimum of the error function that is to be found.

The algorithm is based on the following principle known in itself:

An initial vector, the maximum gradient, is calculated. This vector indicates the director of the maximal slope. This slope is then tracked with a given step until the lowest point is reached (for a given accuracy). At this point a second evaluation of the gradient is effected and the step is halved. A search is conducted along the new line until a minimum is found and this process is repeated. The iterations are stopped when the slope is equal to zero or sufficiently close to this value.

The problem of local minima can be resolved by using different starting points. If they all give the same result, then the minimum found is definitely an absolute minimum.

One way to accelerate convergence and to avoid the local minimum is to find an analytical solution close to the optimum. This can be done by the method of the invention, using the circuit from FIG. 5.

In this figure, the beam forming system from FIG. 3 is preceded by a substitute beam forming system made up of attenuators $A'_i$, phase-shifters $\Phi'_i$ and a Butler matrix FCN' in cascade. The Butler matrix FCN' is the inverse or mirror Butler matrix of the "normal" Butler matrix FCN of FIG. 3. This means that the product of the two transfer matrices is equal to unity. In practise, an inverse Butler matrix can be obtained by using the inputs instead of the outputs and vice-versa. The attenuators $A'_i$, and the phase-shifters $\Phi'_i$ are identical to the corresponding components of the forming system from FIG. 3, respectively $A_i$ and $\Phi'_i$.

It is assumed initially that the attenuation factors $A_i$ are equal to unity and that the phases $\phi_i$ are equal to zero. The target amplitude and phase values $A_i^y$ and $\phi'_i$ are reproduced at the inputs of the inverse Butler matrix FCN'. A series of phase and amplitude values, $A_p$ and $\phi_p$, respectively, is obtained at the outputs. This series is used as the input to the "normal" Butler matrix FCN. By further inversion, the latter gives the required excitations $A_i^y$ and $\phi'_i$ at its outputs.

This solution is not entirely satisfactory because the amplitudes of the signals at the inputs of the amplifiers are no longer identical. These amplitudes depend on how the source elements are connected to the Butler matrix. Accordingly, these connections appear to be very critical. For a system with four source elements there are 4! Possible connections, i.e. 24 different possibilities. This number increases very quickly: for 8 source elements the number of combinations is 8!=40320.

The combination giving the smallest input amplitude differences can be found by testing all possible combinations. This constitutes the starting point of the optimization process: values at the outputs of the inverse Butler matrix, or at the input of the attenuators of the FIG. 3 system.

The starting conditions are then as follows: $F_1=0$ and $F_2$ is as small as possible, as indicated above. As the global error function $F_{err}$ is defined as being equal to $F_1*F_2$, the latter is also equal to zero and the optimization process cannot start.

The solution is to introduce a small random disturbance $\Delta\phi_i$ into the input phases $\phi_i$. As a result, the input vector is no longer optimal (because $F_1 \neq 0$), but nevertheless remains very close to the initial conditions (starting point). This is sufficient to start the optimization process (using the gradient algorithms) and to find the optimal error function (which allows for the attenuation factors). The method of the invention works equally well for complete optimization and for optimization of the phase only.

With a Butler matrix with n inputs it is possible to obtain n different configurations of the antenna coverage, in other words n reconfigurations. There are n excitation coefficients for each element. Because the source elements are connected once and for all to the Butler matrix it is necessary to determine the connections creating a minimal error for all possible coverages, this error being the sum of the n errors corresponding to the n coverages.

If the input amplitude variations are sufficiently small and lie within a permitted range, there is no need to carry out an optimization. Otherwise, optimization is necessary, using the method that has just been described, until the attenuation factors lie in the permitted range. Optimization slightly degrades the output signals of the "normal" matrix but the losses in the amplifiers due to the input signal amplitude imbalances are very greatly reduced.

In some embodiments of antenna the source elements can be arranged in groups. In this case, a possible preliminary step is to determine which groups are to be connected to the Butler matrix. These groups must transmit the same average power. This condition greatly reduces the possible number of groups. The only problem is that it is necessary to carry out an exhaustive search of all possible groups to find the best ones.

With 16 source elements and 4 groups each of 4 source elements, there is a great number of groups procuring an acceptable power distribution and, ideally, the process must be applied to all the groups.

The FIG. 6 diagram shows schematically the possible phases of a complete optimization process and its alternative choices.

Phase 1 consists in looking for source element groups procuring an equal distribution of powers;

Phase 2 consists in looking for the best connection between the source elements of a group or of all the groups;

Phase 3 comprises several steps and alternative choices. The first step, step 30, consists in determining which kind of optimization to use:

a/ at 31, optimization based on the phase;

b/ at 32, phases and attenuations free within a predetermined range;

c/ or, at 33, phases and attenuations free.

Choice 31 leads to phase 4. Choice 32 can lead to phase 4 or phase 5.

Choice 33 leads to phase 5.

Phase 4 constitutes the starting point of the optimization with the following parameters:

a/ phases=0;

b/ attenuations=1.

Phase 5 concerns calculation of the starting point, using the inverse Butler matrix method (see FIG. 5), one group of sources at a time. Phase 4 leads to phase 6. Phase 5 leads to phase 6 or phase 7.

Phase 6 concerns the optimization method proper using the gradient algorithm. At the end of this phase, the attenuators and the phase-shifters are adjusted using the optimization parameters $A_i$ and $\phi_i$ obtained by the optimization.

Phase 7 concerns the situation in which the solution to be applied is that using the starting point values. There is then no need to start the optimization process.

If, the optimization process is actually started, at the end of it the circuits of the substitute stage are withdrawn and the values obtained are used to adjust the input stages (phase 6 above) in such a manner to obtain at the output the target parameters $\phi_i^v$ and $A_i^v$ necessary for the required reconfiguration. The control circuit P is used for this (FIGS. 2 and 3).

To summarize, the optimization method proper comprises the following main steps:

Defining a global error function $F_{err}=F_1*F_2$ with $F_1$ being the sum of the differences between the target signal amplitudes and the signal amplitudes actually obtained and $F_2$ being representative of the variation about 0 dB.

Replacing the input splitter producing signals of equal power with substitute circuits comprising attenuators, input phase-shifters and a Butler matrix in cascade; the attenuators and the phase-shifters ire identical to the attenuators of the FIG. 3 system and the Butler matrix is the inverse matrix of that system.

Applying to the inputs of the substitute circuit the target phase and amplitude parameters and acquiring the phases and amplitudes of the signals at the outputs of the substitute circuits as the starting point parameters.

Launching a gradient type algorithm to look for minimal values from this starting point and acquisition of these minima at the outputs of the substitute circuit.

Withdrawing the substitute circuit and adjusting the attenuator and phase-shifter circuits of the FIG. 3 system using the new parameters corresponding to the above-mentioned minima.

A reading of the above description clearly shows that the invention achieves the stated aims.

It enables optimized reconfiguration of the coverage of a satellite antenna.

However, it must be understood that the numerical values given (number of source elements, etc) have been given only to provide a more concrete example.

Similarly, the type of source element or antenna is not critical. The latter can be of the offset type as described in the article by Howard H. S. LUH previously cited.

As a general rule, the component circuits and units (attenuators, phase-shifters, Butler matrices, etc) can be selected from those used routinely in the prior art, only the architecture of the beam forming system being specific to the invention. The same goes for the frequency bonds used.

There is claimed:

1. A reconfigurable zonal beam forming system for an antenna on a satellite in orbit having a particular number N of channels, comprising at least one input splitter dividing an input signal into N signals of equal amplitude applied to said N channels, a first set of input variable phase-shifters and a set of signal amplifiers, each channel comprising a phase-shifter and an amplifier in cascade, a first Butler matrix with N inputs and N outputs, and N radiating source elements, adjusting the phases of said N input phase-shifters to a particular phase value procuring said reconfiguration of the radiation pattern of the antenna, said system further comprising a second set of N output variable phase-shifters, one of these variable phase-shifters being disposed between each of said outputs of said Butler matrix and each of said radiating source elements, the relative adjustment of the phase-shifts introduced by said input phase-shifters and said output phase-shifters procuring a balanced distribution of the amplitudes of the excitation signals of said radiating source elements necessary for said reconfiguration.

2. The system claimed in claim 1 wherein each input channel includes a variable signal attenuator in cascade with said input phase-shifter.

3. A system as claimed in claim 1 further comprising means for computing optimization parameters and control means for applying to said input and output phase-shifters command signals adjusting their relative phase-shifts in such a manner as to obtain an optimum distribution of said excitation signals of said radiating source elements.

4. A system as claimed in claim 1 further comprising optimization parameter computation means and control means applying to said input and output phase-shifters and to said variable attenuators command signals adjusting their relative phase-shifts and their attenuation coefficient in such a manner as to obtain an optimum distribution of said excitation signals of said radiating source elements.

5. A method of optimizing the reconfiguration obtained by the system as claimed in claim 1, comprising at least the following phases:

a/ defining a global error function $F_{err}=F_1*F_2$, where $F_1$ is the sum of the differences between the amplitudes to be obtained of said excitation signals of said radiating source elements, hereinafter referred to as target signals, and the amplitudes of the signals actually obtained, and $F_2$ represents the variation in the attenuation of said signals about the value 0 dB;

b/ replacing said input splitter dividing said input signal into N signals of equal amplitude applied to said N channels with substitute circuits comprising, in cascade on each of said N channels, an attenuator and an input phase-shifter, and a second Butler matrix; said attenuators and phase-shifters being identical to said attenuators and phase-shifters of said beam forming system and said second Butler matrix being the inverse matrix of said first Butler matrix;

c/ applying to the inputs of said substitute circuit the phases and amplitudes of said target signals and acquiring the phases and amplitudes of said signals at the output of said substitute circuits as starting point parameters;

d/ launching a gradient algorithm to search for minimal values on the basis of said starting point values and acquiring these minima at the outputs of said substitute circuits; and e/ withdrawing said substitute circuit and adjusting said attenuator and phase-shifter circuits of said beam forming system using the parameters determined in the preceding phase, corresponding to said minima;

in such a manner as to obtain a minimal global error for said reconfiguration.

6. A method as claimed in claim 5 including a step prior to said step d/ consisting in the random introduction of a slight disturbance, with a particular maximal amplitude, of the input signals of said first Butler matrix about the value 0 dB.

7. The method claimed in claim 5 wherein after said phase c/ said starting point values are compared to a particular range of reference values and if said starting point values are within a particular range said steps d/ and e/ are not carried out and said attenuator and input phase-shifter circuits of said beam forming system are adjusted directly to said starting point values.

8. A method as claimed in claim 5 including a preliminary phase consisting in searching for the combination of connections between said radiating source elements and said first Butler matrix procuring the lowest difference between the input signal amplitudes.

9. A method as claimed in claim 5 wherein, said radiating source elements being organized into groups, it includes an additional preliminary phase consisting in searching for the group of radiating source elements to be connected to said first Butler matrix procuring the best radiated power distribution.

\* \* \* \* \*